UNITED STATES PATENT OFFICE.

CALVIN DETRICK, OF PITTSTON, PA., ASSIGNOR OF FIVE-TWELFTHS OF HIS RIGHT TO FRANKLIN C. MOSIER, OF SAME PLACE.

PREPARING COAL-CULM FOR FUEL, &c.

SPECIFICATION forming part of Letters Patent No. 223,438, dated January 13, 1880.

Application filed November 21, 1879.

*To all whom it may concern:*

Be it known that I, CALVIN DETRICK, of the borough of Pittston, county of Luzerne, and State of Pennsylvania, have invented and discovered a process for the preparing and burning of small particles of coal, known as "coal-culm," for fuel and heating purposes; and 1 hereby declare the following to be a full, clear, and exact description thereof.

The object of my invention and discovery is to enable me, with certain chemicals, at a small cost per ton, to compress, stamp, and pack coal-culm in blocks, bars, balls, or pieces of any desired shape or size, which shall possess firmness, hardness, and strength to hold together coal-culm while burning, and to remain so until reduced to cinder and ashes.

My invention and discovery consists of a compound composed of certain ingredients united and chemically treated in such a manner as to produce, when thoroughly mixed with coal-culm, a hard inflammable substance, which, after being duly prepared, shall serve as a fuel for burning and heating purposes in any climate and in various ways—to wit, for burning in ranges, stoves, heaters, grates, furnaces, blast-furnaces, blacksmith-forges, for boiler purposes, for getting up steam, and for everything lump or prepared coal is used as a fuel in any way whatsoever.

I first mix together in a suitable vessel or tank two gallons of naphtha, sixteen ounces of calx-spar, twelve ounces of paraffine, four ounces of spermaceti, four drams of carbonate of potash, and four ounces of sesquicarbonate of ammonia. This mixture I thoroughly stir until the soluble ingredients are dissolved, after which I take two quarts of the solution and thoroughly mix with two hundred gallons of water in which forty pounds of tapioca boiled to the condition of paste has been previously dissolved. I then take one part of cement, or one part of lime and cement, each one-half, to ten parts of coal-culm, and thoroughly mix these materials with one another, after which I add and thoroughly stir in a sufficient quantity of the last-mentioned diluted mixture or solution to dampen the whole mass, which is then placed in a rough trough, box, or mold constructed of iron or wood, or any other metal or material, and then pressed, stamped, or packed in any desired shape, after which said coal-culm is mixed with the chemicals and materials hereinbefore mentioned, and then dampened with water for four days in succession, and is then allowed to remain until hard and dry, when it can be shipped or transported to any climate and used for fuel and heating purposes, the same as lump or prepared coal, and at less cost.

Coal-culm compressed and prepared as above stated produces a hard inflammable substance capable of being used as a fuel, the same as lump or prepared coal.

The advantages to be derived from the preparation of coal-culm for fuel and heating purposes are incalculable, for it will consume millions of tons of coal reduced to small particles and piled up in huge piles throughout the anthracite-coal regions.

My invention and discovery will cheapen the price of fuel and put into immediate use about one-fourth of the coal which is now being mined and turned into coal-culm, which is the waste produced in the breaking and preparing of anthracite coal for market, and will save for a longer period of time our anthracite-coal fields, which are now being rapidly worked out.

What I claim as my invention and discovery, and desire to secure by Letters Patent, is—

1. An artificial fuel consisting of coal-culm united, packed, and solidified by mixing therewith cement, or lime and cement, and a chemical solution composed of naphtha, calx-spar, paraffine, spermaceti, carbonate of potash, sesquicarbonate of ammonia, water, and tapioca.

2. The herein-described liquid compound, substantially in the proportions heretofore named, for the purpose of preparing and producing of coal-culm a hard, inflammable, and cheap fuel, as hereinbefore particularly described and set forth.

In witness whereof I have hereunto set my hand this 19th day of November, A. D. 1879.

CALVIN DETRICK.

In presence of—
F. C. MOSIER,
L. B. ENSIGN.